United States Patent [19]

Procida et al.

[11] Patent Number: 4,915,889

[45] Date of Patent: Apr. 10, 1990

[54] METHOD OF PRODUCING AN ELECTRICALLY SEMI-CONDUCTING, STRIPPABLE PLASTICS MIXTURE

[75] Inventors: Inger-Margrete Procida, Hellerup; Keld V. Poulsen, Lynge, both of Denmark

[73] Assignee: NKT A/S, Brondby, Denmark

[21] Appl. No.: 263,774

[22] PCT Filed: Feb. 19, 1988

[86] PCT No.: PCT/DK88/00031

§ 371 Date: Dec. 9, 1988

§ 102(e) Date: Dec. 9, 1988

[87] PCT Pub. No.: WO88/06341

PCT Pub. Date: Aug. 25, 1988

[30] Foreign Application Priority Data

Feb. 20, 1987 [DK] Denmark ............... 890/87

[51] Int. Cl.$^4$ ............ B29C 47/06; B29C 67/00; B32B 27/18; H01B 1/06
[52] U.S. Cl. ............ 264/83; 174/102 SC; 252/511; 264/105; 264/117; 264/118; 264/122; 264/174; 264/211; 264/211.13; 264/211.2; 264/236
[58] Field of Search ............ 264/83, 105, 117, 118, 264/122, 174, 211, 211.13, 211.2, 236; 252/511; 174/102 SC; 524/495

[56] References Cited

U.S. PATENT DOCUMENTS

| | | | |
|---|---|---|---|
| 2,930,083 | 3/1960 | Vostovich et al. | 264/174 |
| 3,946,099 | 3/1976 | Mackenzie, Jr. | 264/174 |
| 4,008,113 | 2/1977 | Glander et al. | 156/52 |
| 4,046,849 | 9/1977 | Lever et al. | 264/174 |
| 4,058,583 | 11/1977 | Glander et al. | 264/174 |
| 4,117,195 | 9/1978 | Swarbrick et al. | 264/174 X |
| 4,136,132 | 1/1979 | Poole | 264/211 X |
| 4,297,310 | 10/1981 | Akutsu et al. | 264/83 |
| 4,489,029 | 12/1984 | Keogh et al. | 264/174 |
| 4,493,787 | 1/1985 | Taniguchi et al. | 252/511 |
| 4,534,889 | 8/1985 | Van Konynenburg et al. | 252/511 |
| 4,581,158 | 4/1986 | Lin | 252/511 |
| 4,592,861 | 6/1986 | Bekele et al. | 252/511 |
| 4,592,862 | 6/1986 | Nakamura et al. | 252/511 |
| 4,655,964 | 4/1987 | Steinberger et al. | 252/511 |
| 4,716,000 | 12/1987 | Kerschbaum et al. | 264/83 |
| 4,767,894 | 8/1988 | Schomobourg | 174/102 SC X |

FOREIGN PATENT DOCUMENTS

| | | |
|---|---|---|
| 110371 | 6/1984 | European Pat. Off. |
| 167905 | 1/1986 | European Pat. Off. |
| 167997 | 1/1986 | European Pat. Off. |
| 173560 | 3/1986 | European Pat. Off. |
| 191256 | 8/1986 | European Pat. Off. |
| 2426100 | 12/1975 | Fed. Rep. of Germany ...... 264/174 |
| 2458776 | 6/1976 | Fed. Rep. of Germany ...... 264/174 |
| 2832120 | 1/1980 | Fed. Rep. of Germany ...... 264/174 |
| 61-44936 | 3/1986 | Japan ............... 252/511 |
| 979424 | 12/1982 | U.S.S.R. ............... 252/511 |
| 1286460 | 8/1972 | United Kingdom . |
| 1526398 | 9/1978 | United Kingdom . |

*Primary Examiner*—Jeffery Thurlow
*Assistant Examiner*—Leo B. Tentoni
*Attorney, Agent, or Firm*—Ladas & Parry

[57] ABSTRACT

An electrically semi-conducting, strippable coating material for electric wires and cables is produced by intimately mixing a premix of a polyolefin with an unsaturated organic silane, a free-radical-forming organic compound and optionally plastics additives in a hot state, until the unsaturated organic silane has reacted significantly with the polyolefin and/or the copolymerizate of olefins, preferably for ½–30 min. at 180°–230° C., and subsequently admixing comminuted carbon while the mixture is still hot.

14 Claims, No Drawings

METHOD OF PRODUCING AN ELECTRICALLY SEMI-CONDUCTING, STRIPPABLE PLASTICS MIXTURE

The present invention relates to a method of producing an electrically semi-conducting, strippable plastics mixture, in particular for use as screening material for electric wires and cables.

BACKGROUND OF THE INVENTION

Electric wires and cables, such as copper wires, are often covered with a coating material or a protective sheath, which may be a plastics material. Sometimes the wire or cable is coated with several layers, e.g. a combination of one or several layers of semi-conducting material, one or more layers of insulating material and possibly with a metal taping or metal braid and an outer sheath.

It is known to use a coating consisting of an electrically semi-conducting plastics mixture which must be strippable to allow wire or cable ends to be stripped for connection.

It is the object of the present invention to produce an electrically semi-conducting strippable plastics mixture which is suited for use as screening material for electric wires and cables.

DESCRIPTION OF THE PRIOR ART

GB patent specification No. 1 286 460 describes a method of producing a cross-linked polyolefin, in which thermoplastic polyethylene or a copolymer of ethylene and a small amount of propylene and/or butylene is mixed with an unsaturated hydrolyzable silane in the presence of a free-radical-forming compound, e.g. a peroxide, the reaction being carried out at a temperature preferably within the range 160°-220° C., whereafter the mixture or a shaped product thereof is moisture-exposed to complete the cross-linking reaction.

The known material thus produced possesses high stress crazing resistance and a high tensile strength.

Furthermore, it possess high organic solvent resistance.

Because of these properties, the material has been suggested for use as electric insulation material and for containers and tubes which come into contact with hot fluids. On the other hand, it has not been possible on the basis of such a mixture or on the basis of otherwise known techniques to produce satisfactory, electrically semi-conducting, strippable coating materials suited for live electric wires and cables.

GB patent specification No. 1 526 398 describes the production of similar cross-linked polyolefins or copolymerizates which are particularly suited for insulating electric cables and for tube manufacture. This material is not semi-conducting either. It is, however, possible to add carbon black, but only in small amounts, and with the aim of achieving coloring or protection against sunlight, but not of achieving semi-conducting properties.

In order to produce an electrically semi-conducting material it would be obvious to modify one of the above known processes by admixing larger amounts of comminuted carbon, such as carbon black. Experiments, however, have shown that no satisfactory cross-linking of the semi-conducting material and consequently unsatisfactory mechanical properties are obtained by that procedure.

SUMMARY OF THE INVENTION

According to the present invention it has now surprisingly been found that a cross-linkable material with optimum semi-conducting properties and which is also strippable can be obtained if the comminuted carbon is admixed when the other plastics components have been intimately mixed and the cross-linking agent already has reacted with the polymeric materials. The stated mixing order is decisive to the achievement of the aimed at electric and in particular mechanical properties at the cable operating temperature.

DESCRIPTION OF THE PREFERRED EMBODIMENT

Thus the invention relates to a method of producing an electrically semi-conducting, strippable plastics mixture, in particular for use as screening material for electric wires and cables, according to which a polyolefin and/or a copolymerizate of several olefins is mixed with a hydrolyzable unsaturated organic silane, a free-radical-forming organic compound, possible suited plastics additives and hot comminuted carbon, the method being characterized in that a premix containing the polyolefin and/or the copolymerizate of olefins, the organic silane, the free-radical-forming organic compound and optional conventional additives are intimately mixed in a hot state, until the unsaturated organic silane has reacted substantially with the polyolefin and/or the copolymerizate of olefins, the comminuted carbon subsequently being added to the premix while it is still hot.

The free-radical-forming organic compound is preferably peroxide.

According to a preferred embodiment of the method according to the invention the premix is treated for $\frac{1}{2}$–30 min. at a temperature within the range 180° C.–230° C., whereafter while the premix is still hot the comminuted carbon is admixed under continued mixing, the mixture subsequently being cooled and granulated.

Temperature and treatment time as well as the kind and amount of peroxide are so adjusted that the silane compound reacts significantly with the polymeric material, however, without formation of cross-linkages between the polymeric chains. The reaction progresses most rapidly at the highest temperature. At temperatures above 230° C. there is risk of the cross-linkage continuing to completion, thus making it impossible subsequently to shape the plastics mixture.

A BanBury-mixer or an extruder is well-suited for kneading and homogenizing the premix and for the subsequent admixing of comminuted carbon. Preferred carbon is carbon black having a BET-surface larger than 150 $m^2/g$.

The invention also relates to a method of applying the coating material according to the invention around a wire or a cable. This is advantageously done be extruding the plastics mixture at a temperature within the range 180° C.–210° C., as a conventional extruder can be used.

According to one embodiment of the invention the electrically semi-conducting plastics mixture may be an ethylene-copolymer, in which the second monomer in an amount of 15–45% may be of the type methylacrylate, vinylacrylate, ethylacrylate or vinylacetate or mixtures thereof in an amount of 40–70 weight-%, mixed with polyolefin of the type polyethylene, polypropylene or copolymers hereof or mixtures thereof in an amount of 10-30 weight-%, and an elastomeric ethylenepropylenecopolymer or ethylenepropyleneterpolymer in an amount of 3-15 weight-%. The organic peroxide is advantageously present in an amount of 0.01-1.0 weight-%, and the organic silane in an amount of 0.2-2.0 weight-%. Furthermore, an antioxydant may be admixed in an amount of 0.2-2 weight-%, and one or more lubricants in an amount of 0.001-5 weight-%. The comminuted carbon imparting the electrically semi-conducting properties to the plastics mixture is preferably carbon black having a surface (according to the BET-method) in excess of 150 m²/g. The volumetric resistance of the electrically semi-conducting plastics mixtures measured according ASTM d257 is less than 1000 ohm x cm at 20° C. and 90° C.

In the following the method according to the invention is further described by way of an example.

EXAMPLE

A series of plastics mixtures were produced having compositions within the following ranges, all stated in parts by weight:

| I | Ethylene-copolymer of type 1 | 28 to 63 |
|---|---|---|
| II | Ethylene-copolymer of type 2 | 0 to 32 |
| III | Polyolefin of type 1 | 15 to 20 |
| IV | Polyolefin of type 2 | 1 to 3 |
| V | Elastomers | 3 to 6 |
| VI | Organic peroxide | 0.06 to 0.14 |
| VII | Organic silan | 1.2 to 1.8 |
| VIII | Antioxydant | 0.4 to 1 |
| IX | Lubricant | 0.1 to 0.2 |
| X | Carbon | 12 to 18 |

Components I-IX are introduced into a mixer in the stated order, the temperature in the mass during the tumbling being raised to 215°-220° C. After a few minutes the carbon-component is added, and the mixture is cooled and granulated.

From the semi-conducting plastics mixture formed there were partly pressed a 1.5 mm thick sheet at 185° C., and partly extruded a 1.5 mm thick band by introducing the mixture into an extruder equipped with a 30 mm screw having an L:D-ratio of 20:1.

Both the pressed sheet and the extruded band were cross-linked by submersion for 16 hours in 85° C. hot water admixed 0.5 weight-% dibutylindilaurate. Steaming is an alternative water treatment.

The cross-linked blanks thus produced were tested as follows:

1. Hot set test according to IEC 502/540; 200° C./20N/15 min.
   Measured value: 25%
2. Permanent elongation according to IEC 502/540; 200° C./20N/15 min.
   Measured value: 0%
3. Gel-content after boiling for 6 hours in decahydronaphtalene:
   Measured value: 70%
4. Volumetric resistance according to ASTM D 257 at 20° C.
   Measured value: 75 ohm x cm.

We claim:

1. A method of producing an electrically semi-conducting, strippable plastic composition for use as a coating material for electrical wires or cables, wherein an olefin polymer, a hydrolyzable unsaturated organic silane, an organic free-radical-forming compound and optionally plastic additives are mixed in a hot state until the unsaturated organic silane has reacted with the polymer to form a premix, whereafter comminuted carbon particles are added while the premix is still hot, the mixture is subsequently granulated and cooled.

2. A method according to claim 1, wherein the premix is treated for ½-30 min. at a temperature within the range 180° C.-230° C., whereafter, while the premix is still hot, the comminuted carbon is admixed under continued tumbling.

3. A method according to claim 2, wherein the premix is treated for ½-5 min. at 200° C.-220° C. before admixing the comminuted carbon.

4. A method according to claim 1, wherein the premix is kneaded in a mixer.

5. A method according to claim 1, wherein the comminuted carbon is carbon black having a BET-surface larger than 150 m²/g.

6. A method according to claim 1, wherein the organic free-radical-forming compound, is an organic peroxide.

7. A method according to claim 1, wherein the premix is kneaded in an extruder.

8. A method according to claim 7, wherein the extruder has an L:D ratio of about 15:1.

9. A method according to claim 7, wherein the premix is kneaded in an extruder having a L:D-ratio between 10:1 and 30:1.

10. A method of applying an electrically semi-conducting, strippable plastics composition produced according to claim 1, as a covering around an electrical wire or cable, wherein the plastic composition at a temperature of 180° C.-210° C. is extruded around the wire or cable, whereafter the covering is treated with water to promote cross-linking.

11. A method according to claim 10, wherein the coated wire or cable is passed through water at a temperature of about 85° C. for about 16 hours.

12. A method according to claim 10, wherein the coated wire or cable is subjected to a treatment with steam.

13. A method according to claim 1, wherein the olefin polymer is a copolymer.

14. A method according to claim 1, wherein the olefin polymer is a mixture of homopolymer and copolymer.

* * * * *